(12) United States Patent
Singla et al.

(10) Patent No.: US 6,878,311 B2
(45) Date of Patent: Apr. 12, 2005

(54) CERAMIC MIXTURE HAVING NEGATIVE TEMPERATURE CO-EFFICIENT, A THERMISTOR CONTAINING THE CERAMIC MIXTURE AND A PROCESS FOR PREPARING SAME

(75) Inventors: Madan Lal Singla, Chandigarh (IN); Raj Baldev, Chandigarh (IN); Harchekar Vijay Rajaram, Chandigarh (IN); Ram Prakash Bajpal, Mysore (IN)

(73) Assignee: Council of Scientific and Industrial Research, New Delhi (IN)

( * ) Notice: Subject to any disclaimer, the term of this patent is extended or adjusted under 35 U.S.C. 154(b) by 165 days.

(21) Appl. No.: 10/403,594

(22) Filed: Mar. 31, 2003

(65) Prior Publication Data

US 2004/0164280 A1 Aug. 26, 2004

(30) Foreign Application Priority Data

Feb. 25, 2003 (WO) .................... PCT/IB03/00784

(51) Int. Cl.[7] ................ H01B 1/08; H01C 7/04; C04B 35/50
(52) U.S. Cl. ................ 252/521.1; 338/22 SD; 338/22 RE
(58) Field of Search ................ 252/521.1; 338/22 RE, 338/22 SD; 423/21.1, 263, 599

(56) References Cited

U.S. PATENT DOCUMENTS 6,469,612 B2 * 10/2002 Nakayama et al. ....... 338/22 R

FOREIGN PATENT DOCUMENTS

JP         1-290549      * 11/1989

* cited by examiner

Primary Examiner—Mark Kopec
(74) Attorney, Agent, or Firm—John W. Renner; Renner, Otto, Boisselle & Sklar

(57) ABSTRACT

A ceramic mixture composition having negative temperature coefficient of resistance (NTC), the said composition comprising about 95 weight % of the tetragonal form of $Mn_3O_4$ and about 5 weight % of $La_2O_3$, the said ceramic mixture is mixed with stearic acid and wax, compacted and provided with two electrodes disposed from each other to form a thermistor having resistance on the order of mega ohm at a temperature of 25° C. and the resistance of the thermistor drops by almost 40% with every 20° C. rise in temperature and stabilizes to 250±50 ohms at a temperature range of 330° C.±6%.

36 Claims, 1 Drawing Sheet

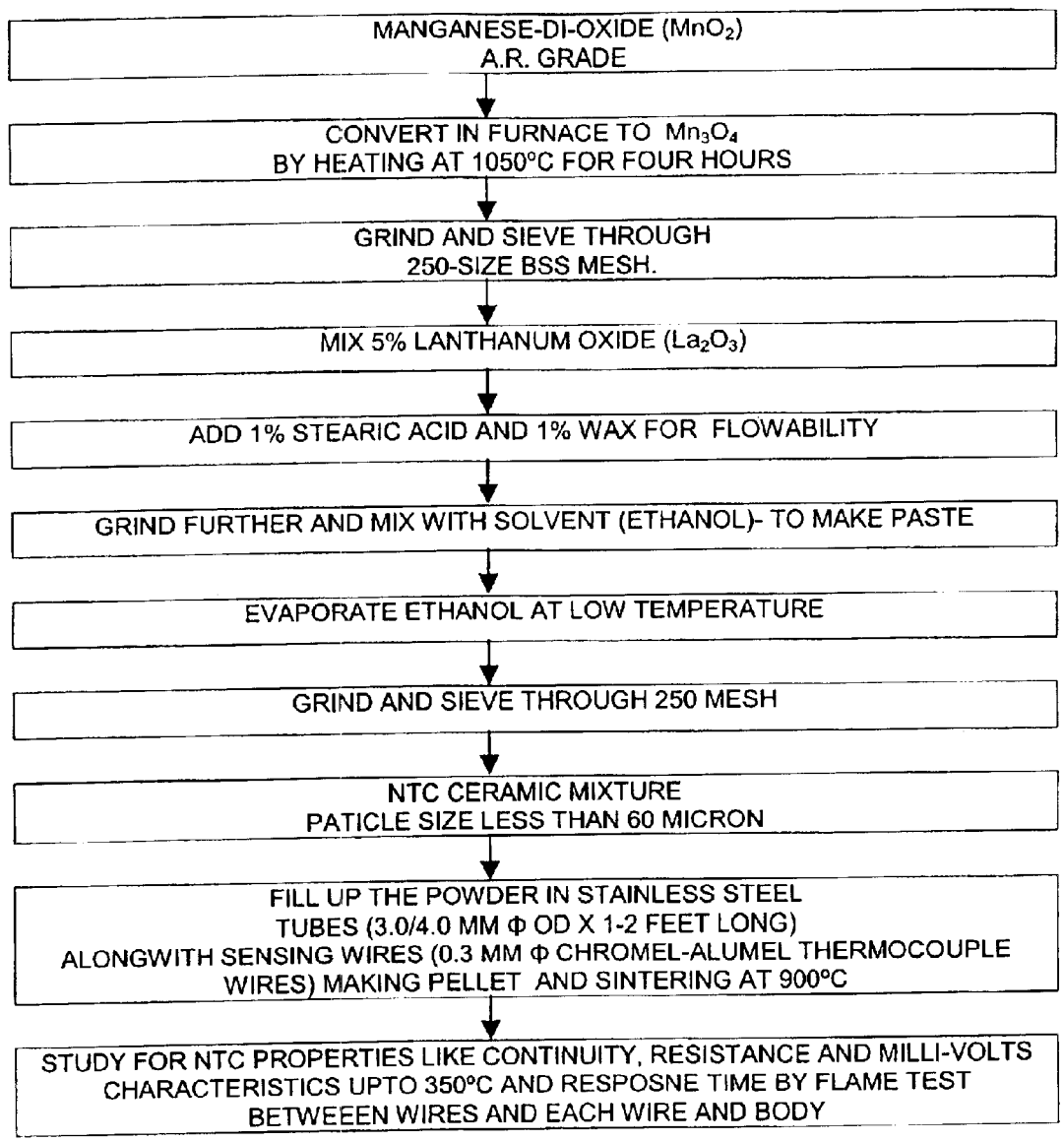
FIGURE 1: PROCESS FLOW SHEET FOR THE PREPARATION OF NTC CERAMIC COMPOUND WORKING UPTO 350°C

CERAMIC MIXTURE HAVING NEGATIVE TEMPERATURE CO-EFFICIENT, A THERMISTOR CONTAINING THE CERAMIC MIXTURE AND A PROCESS FOR PREPARING SAME

This application claims priority to International Patent Application Ser. No. PCT/IB03/00784, filed Feb. 25, 2003.

FIELD OF THE INVENTION

The present invention relates to a novel ceramic mixture having negative temperature coefficient of resistance and a process for preparing said ceramic mixture. The present invention also relates to a thermistor prepared from the said ceramic mixture that can work at a temperature range of 330° C.±6% and a process for preparing the said thermistor.

BACKGROUND OF THE INVENTION

A thermistor is a thermally sensitive resistor whose primary function is to exhibit a change in electric resistance with a change in body temperature. Unlike a wire wound or metal film resistance temperature detector (RTD), a thermistor is a ceramic semiconductor. It has a metal sheathing (stainless steel or Inconel) and contains one or two thermocouple Sensing Wires (Chromel-Alumel-K Type or Chromel-Constantan-E type) running parallel to the metal sheathing and insulated from each other and sheathing by a ceramic insulating compound. Depending on the type of material used, a thermistor can have either a large positive temperature coefficient of resistance (PTC) or a large negative temperature coefficient of resistance (NTC).

Thermal sensors can detect temperature, infra-red source and its size, moving direction and speed, emissivity and wave length. As such, these can find applications in intruder alarms, fire alarms, laser detection, thermal recording, etc. (*Sensors and Actuators*, by MoonhoLee, Mina Yoo, A-96 (2002) pp. 97–104). NTC sensors now a days are most commonly used in automotive applications (*Sensors*, Vol IV, by W. Gopel, J. Hesse, J. N. Zemel, Vol. 4, (1990)) and in precise temperature monitoring devices for temperature measurements, control and compensation. These sensors can provide precise temperature information at critical points. These type of sensors are reliable, stable, re-useable and maintenance free. A number of materials have been reported.

Thermistors are polycrystalline mixtures of sintered metallic oxides ($NiO$, $Mn_2O_3$, and $Co_2O_3$) or solid solutions ($MgCr_2O_4$ in $Fe_3O_4$) that behave essentially as semiconductors. As a result, they have negative temperature coefficients of resistance. They have proved successfully in a variety of shapes as small, inexpensive, sensitive, fast response temperature sensors, within the range—100° C. to 300° C. Thermistors for above 300° C. are made of oxides of rare earth elements, which are more refractory than nickel and manganese oxides and possesses higher activation energy. Thermistors for cryogenic use are mostly made from non-stoichiometric iron oxides which exhibit very low activation energy (*Sensors*, Vol IV, by W. Gopel, J. Hesse, J. N. Zemel Vol. 4, (1990)).

NTC thermistors consist of metal oxides, such as oxides of manganese, chromium, cobalt, copper, iron, nickel, titanium with different stoichiometric ratios, etc., and with different combinations (*Measurements, Instrumentation and Sensors Hand Book*, by Meyer Sapoff, p. 32.25). These exhibit a monotonic decrease in electric resistance with an increase in temperature. A number of papers have also been published with different combinations of La—Sr—Mn—O film $La_{0.75}Ca_{0.25}MnO_3$, $La_{2/3}Sr_{1/3}MnO_3$ pervoskite, etc., for magnetoresistive sensor (4,5,6,7). However, no studies so far have been reported with 95% $Mn_3O_4$ and 5% $La_2O_3$ mixture as NTC material.

Another reference may be made to *Journal of Applied Physics* by Sam Jin Kim and Chul Sung Kim, Vol. 91, No. 1 (January 2001) pp. 221–224.

Yet another reference may be made to *Physics of Manganites* by T. A Kaplan and S. D. Mahanti, 1998, p. 201.

One more reference may be made to *Sensors and Actuators*, by L I. Balcells, J. Cifre, A. Calleja, J. Fontcuberala, M. Varela and F. Benilez. 81 (2000) pp. 64–666.

OBJECT OF THE INVENTION

The main object of the present invention is to provide a ceramic mixture having negative thermal co-efficient (NTC).

Another object of the present invention is to develop a ceramic mixture having long shelf life and that can easily be used in different environments.

Still another object of the present invention is to provide a ceramic mixture that has sufficient flowability for filling in long tubes having internal diameters up to 2.0 mm.

Yet another object of the present invention is to provide a ceramic mixture that can be compacted into a thick mass so that the properties do not deviate.

One more object of the present invention is to provide a thermistor comprising the ceramic mixture and capable of sensing temperature in the range of 300 to 350° C.

Another object of the present invention is to provide a thermistor that has resistance on the order of mega ohms at room temperature and nearly 250±50 ohms at 330° C.±6% and there may not be much variation in its resistance after 350° C.

Another object of the present invention is to develop a reliable thermistor which has negative thermal coefficient and gives reproducible results.

A further object of the present invention is to provide a thermistor for use in different strategic devices like air crafts, armored tanks, explosive store houses etc.

SUMMARY OF THE INVENTION

Accordingly, the present invention provides a novel ceramic mixture composition containing 95% tetragonal form of $Mn_3O_4$ and 5% $La_2O_3$ having a negative temperature coefficient of resistance and a thermistor for sensing temperatures in the range of 330±6%, the said thermistor comprising the ceramic mixture along with stearic acid and wax forming a base, the said base being provided with first and second electrodes that are being disposed away from each other. The present invention also provides a process for preparing the ceramic mixture and the thermistor.

DETAILED DESCRIPTION OF THE INVENTION

The present invention provides-a ceramic mixture composition having a negative temperature co-efficient (NTC) of resistance when compacted, said ceramic mixture comprising about 95 weight % tetragonal form of $Mn_3O_4$ and about 5 weight % $La_2O_3$.

In an embodiment of the present invention, the ceramic mixture composition has resistance on the order of megaohms at 25° C. and the resistance value drops to a value between 200 to 300 ohms at 300° C. to 350° C.

In another embodiment of the present invention, the ceramic mixture composition shows increase in potential from −50 mV at 35° C. to 13.9 mV at 330° C.

In yet another embodiment of the present invention, the ceramic mixture composition does not degrade with time.

In still another embodiment of the present invention, the ceramic mixture composition works at low temperatures as well as high temperatures.

The present invention also provides a process for preparing a ceramic mixture having negative temperature coefficient of resistance, the process comprising the steps of:

(a) heating $MnO_2$ to obtain the tetragonal form of $Mn_3O_4$;

(b) cooling the $Mn_3O_4$ of step (a);

(c) grinding the $Mn_3O_4$ of step (b) to obtain $Mn_3O_4$ of particle size less than about 60 microns;

(d) mixing the ground $Mn_3O_4$ of step (c) with about 5 weight % of $La_2O_3$; and (e) grinding and sieving the mixture of $Mn_3O_4$ and $La_2O_3$ to obtain the ceramic mixture.

In an embodiment of the present invention wherein in step (a), the $MnO_2$ used is of analytical reagent grade.

In another embodiment of the present invention wherein in step (a), the $MnO_2$ is heated up to 1050° C. for a time period ranging between 4 hours to 5 hours.

In yet another embodiment of the present invention wherein in step (b), the $Mn_3O_4$ is furnace cooled.

In still another embodiment of the present invention wherein in step (c), the $Mn_3O_4$ is ground in a mortar and pestle.

In one more embodiment of the present invention wherein in step (c), the $Mn_3O_4$ is sieved through a 250 size BSS mesh.

In one another embodiment of the present invention wherein in step (e), the mixture of $Mn_3O_4$ and $La_2O_3$ is ground in mortar and pestle.

In a further embodiment of the present invention wherein in step (e), the ground mixture is sieved through a 250 size BSS mesh.

The present invention further provides a thermistor for sensing temperature, the said thermistor comprising the ceramic mixture having negative thermal coefficient along with stearic acid and wax as a base, the said base being provided with first and second electrodes that are disposed away from each other.

In an embodiment of the present invention, the ceramic mixture comprises about 95 weight % tetragonal form of $Mn_3O_4$ and about 5 weight % $La_2O_3$.

In another embodiment of the present invention, the weight % of stearic acid used is about 1.0.

In yet another embodiment of the present invention, the weight % of wax used is about 1.0.

In still another embodiment of the present invention, the thermistor is used for sensing temperature in the range of 300 to 350° C.

In one more embodiment of the present invention, the resistance of the sensor drops by 30 to 50% of its original value with every 20° C. rise in temperature.

In one another embodiment of the present invention, the resistance of the sensor drops by 40% of its original value with every 20° C. rise in temperature.

In a further embodiment of the present invention, the first and second electrodes are provided on the surface of the element assembly.

In an embodiment of the present invention, the first and second electrodes are provided inside the element assembly.

In another embodiment of the present invention, the first and second electrodes are made of conducting material.

The present invention provides a process for preparing the thermistor having negative temperature coefficient of resistance for sensing temperature, said process comprising the steps of:

(a) heating $MnO_2$ to obtain the tetragonal form of $Mn_3O_4$;

(b) cooling the $Mn_3O_4$ of step (a);

(c) grinding the $Mn_3O_4$ of step (b) to obtain $Mn_3O_4$ of particle size less than about 60 microns;

(d) mixing the ground $Mn_3O_4$ of step (c) with about 5 weight % of $La_2O_3$;

(e) grinding and sieving the mixture of step (d) to obtain a ceramic mixture;

(f) adding stearic acid and wax to the ceramic mixture of step (e);

(g) grinding the mixture of step (f) optionally in the presence of an alcohol and sieving, and (h) compacting and sintering the ground mixture of step (g) and providing a first and second electrodes to obtain the thermistor.

In an embodiment of the present invention wherein in step (a), the $MnO_2$ used is of analytical reagent grade.

In another embodiment of the present invention wherein in step (a), the $MnO_2$ is taken in a silica crucible and heated up to 1050° C. for a time period ranging between 4 hours to 5 hours in a muffle furnace.

In yet another embodiment of the present invention wherein in step (c), the $Mn_3O_4$ is ground in a mortar and pastel.

In still another embodiment of the present invention wherein in step (c), the $Mn_3O_4$ is sieved through a 250 size BSS mesh.

In one more embodiment of the present invention wherein in step (e), the mixture of $Mn_3O_4$ and $La_2O_3$ is ground in mortar and pestle.

In one another embodiment of the present invention wherein in step (e) the ground mixture is sieved through a 250 size BSS mesh.

In a further embodiment of the present invention wherein in step (f), about 1% stearic acid and about 1% wax are added to the ceramic mixture to improve flowability and binding capacity.

In an embodiment of the present invention wherein in step (g), the mixture of $Mn_3O_4$, $La_2O_3$, stearic acid, wax and alcohol is ground in a mortar and pestle.

In another embodiment of the present invention wherein in step (g), the ground mixture is sieved through a 250 size BSS mesh.

In yet another embodiment of the present invention wherein if alcohol is added during grinding in step (g), the sieved mixture is gradually heated to remove the alcohol.

In still another embodiment of the present invention wherein in step (h), the ground mixture is compacted and sintered to form pellets, and the first and second electrodes are deposited on an outer surface of the pellet to obtain the thermistor.

In one more embodiment of the present invention wherein in step (h), the ground mixture is filled in tubes provided with the first and second electrodes, compacted and sintered to obtain the thermistor.

In one another embodiment of the present invention, the first and second electrodes being deposited in step (h) are made of conducting material.

The present invention relates to the development of a new ceramic mixture which has negative temperature coefficient (NTC) characteristics for thermal sensing devices/sensors. The tetragonal form of manganese oxide ($Mn_3O_4$) has been mixed with lanthanum oxide ($La_2O_3$) to form a mixture of these compounds. In order to get the desired properties, to increase its flowability and binding, the mixture was ground (less than 60 microns) and mixed with stearic acid (1%) and wax (1%). This material when compacted in the form of pellets or filled in a tube with compression has a resistance on the order of mega ohms and output voltage on the order of −50.00 mV at 30° C. On heating the resistance drops almost 40% of its value for every 20° C. rise in temperature.

The $MnO_2$ used is of A. R. Grade, and was converted to the tetragonal form of $Mn_3O_4$. The structure was confirmed by XRD technique. Tetragonal $Mn_3O_4$ was mixed with lanthanum oxide (La$_2$O$_3$) in the ratio of 95:5. The mixture was ground and sieved through a 250 BSS Mesh size (particle size <60 microns) to obtain the ceramic mixture. For preparing the thermistor, the ceramic mixture thus obtained is mixed with 1% stearic acid and 1% wax to improve the flowability in the pipe of up to 2.0 mm inner diameter. This powder was filled into tubes or compacted to form pellets and sintered at 900° C. for one hour so that material attains dry strength and has continuity at any two points.

BRIEF DESCRIPTION OF THE ACCOMPANYING DRAWINGS

FIG. 1 shows a process flow sheet for the preparation of NTC ceramic compound working up to 350° C.

The present invention is described further with respect to the example, which is given by way of illustration and hence, should not be considered to limit the scope of the invention in any manner.

EXAMPLE 1

Manganese dioxide (MnO$_2$) Analytical Reagent (AR) quality was taken in silica crucibles and heated to a temperature of 1050° C. in a muffle furnace. The MnO$_2$ was kept at this temperature for 4 to 5 hours in order to convert MnO$_2$ to Mn$_3$O$_4$. The structure of Mn$_3$O$_4$ is tetragonal and is confirmed by XRD. The material is then furnace cooled. Mn$_3$O$_4$ is then ground in mortar and pestle and sieved through a 250 size BSS mesh (<60 micron size). This ground oxide is mixed with 5% lanthanum oxide (La$_2$O$_3$) and ground thoroughly in mortar and pestle to obtain the ceramic mixture. Stearic acid (1%) and wax (1%) was then added and again ground using alcohol. It was then slowly heated in order to remove the alcohol. The mixture was again ground and sieved through a 250 BSS Mesh. The material is characterized for potential drop and resistance change. The mixture thus obtained having ceramic powder, steric acid and wax is filled in about one foot long stainless steel tubes and two sensing wires (chromel and alumel wires) are inserted into the powder inside the tube. The powder is then compacted inside the tube by ramming. These tubes were then sintered at 900° C. for 4 to 5 hours so that the material becomes a hard mass. The powder can otherwise be compressed at about 10 tons/inch$^2$ in a die to make pellets/tablets. A detailed block diagram of depicting the process for preparing the ceramic mixture and the thermistor thereof is shown in FIG. 1. These ceramic tablets/filled tubes with ceramic powder were characterized for potential drop and drop in resistance. The tests were repeated several times for about one year to check the stability/repeatability of the test results. The results of the test thus conducted are tabulated in Table 1 given below.

Some of the advantages of the present invention are:

It gives NTC characteristics.

This material has resistance on the order of mega ohms at 25° C. and this value drops to 200 to 300 ohms between 300° C. to 350° C. Therefore, this material has been used in fire safety sensors/devices for strategic applications.

The material has good flowability. Therefore, it is possible to fill up this material in small diameter and long tubes.

The material does not degrade with time, temperature and other environmental changes.

The chemicals are easily available and processable.

What is claimed is:

1. A ceramic mixture composition having a negative temperature co-efficient (NTC) of resistance when compacted, said ceramic mixture comprising about 95 weight % tetragonal form of Mn$_3$O$_4$ and about 5 weight % La$_2$O$_3$.

2. A ceramic mixture composition as claimed in claim 1, wherein the ceramic mixture composition has a resistance on the order of mega-ohms at 25° C. and the resistance value drops to a value between 200 to 300 ohms at 300° C. to 350° C.

3. A ceramic mixture composition as claimed in claim 1, wherein the ceramic mixture composition shows an increase in potential from about −50 mV at 35° C. to about 13.9 mV at 330° C.

4. A ceramic mixture composition as claimed in claim 1, wherein the ceramic mixture composition does not degrade with time.

5. A ceramic mixture composition as claimed in claim 1, wherein the ceramic mixture composition works at low as well as high temperatures.

6. A process for preparing a ceramic mixture of claim 1 having negative temperature coefficient of resistance, the said process comprising the steps of:
   (a) heating MnO$_2$ to obtain the tetragonal form of Mn$_3$O$_4$;
   (b) cooling the Mn$_3$O$_4$ of step (a);
   (c) grinding the Mn$_3$O$_4$ of step (b) to obtain Mn$_3$O$_4$ of particle size less than 60 microns;
   (d) mixing the ground Mn$_3$O$_4$ of step (c) with 5 wt. % of La$_2$O$_3$; and
   (e) grinding and sieving the mixture of Mn$_3$O$_4$ and La$_2$O$_3$ to obtain the ceramic mixture.

7. A process as claimed in claim 6 wherein in step (a), the MnO$_2$ used is of analytical reagent grade.

8. A process as claimed in claim 6 wherein in step (a), the MnO$_2$ is heated up to 1050° C. for a time period ranging between 4 hours to 5 hours.

9. A process as claimed in claim 6 wherein in step (b), the Mn$_3$O$_4$ is furnace cooled.

TABLE 1

| | Composition | | | | | |
|---|---|---|---|---|---|---|
| | Manganese Oxide | Lanthanum Oxide | Resistance | | Output Voltage | |
| S. No. | (Mn$_3$O$_4$) | (La$_2$O$_3$) | at 30° C. | at 330° C. | at 30° C. | at 330° C. |
| 1 | 95% | 5% | 3.00 Mega Ω | 280 Ω | −50 mV | 13.7 mV |
| 2 | 95% | 5% | 3.20 Mega Ω | 220 Ω | −45 mV | 13.9 mV |
| 3 | 95% | 5% | 3.37 Mega Ω | 250 Ω | −52 mV | 13.8 mV |
| 4 | 95% | 5% | 3.28 Mega Ω | 260 Ω | −55 mV | 13.5 mV |
| 5 | 95% | 5% | 4.00 Mega Ω | 300 Ω | −50 mV | 13.9 mV |

10. A process as claimed in claim 6 wherein in step (c), the $Mn_3O_4$ is ground in a mortar and pestle.

11. A process as claimed in claim 6 wherein in step (c), the $Mn_3O_4$ is sieved through a 250 size BSS mesh.

12. A process as claimed in claim 6 wherein in step (e), the mixture of $Mn_3O_4$ and $La_2O_3$ is ground in mortar and pestle.

13. A process as claimed in claim 6 wherein in step (e), the ground mixture is sieved through a 250 size BSS mesh.

14. A thermistor for sensing temperature, the said thermistor comprising the ceramic mixture of claim 1 along with stearic acid and wax as a base, the said base being provided with a first and a second electrode that are disposed away from each other.

15. A thermistor as claimed in claim 14, wherein the weight % of stearic acid used is about 1.0.

16. A thermistor as claimed in claim 14, wherein the weight % of wax used is about 1.0.

17. A thermistor as claimed in claim 14, wherein the thermistor is used for sensing temperature in the range of 300° to 350° C.

18. A thermistor as claimed in claim 14, wherein the resistance of the sensor drops by 30 to 50% of its original value with every 20° C. rise in temperature.

19. A thermistor as claimed in claim 14, wherein the resistance of the sensor drops by 40% of its original value with every 20° C. rise in temperature.

20. A thermistor as claimed in claim 14, wherein the first and second electrodes are provided on the surface of the element assembly.

21. A thermistor as claimed in claim 14, wherein the first and second electrodes are provided inside the element assembly.

22. A thermistor as claimed in claim 14, wherein the first and the second electrodes are made of a conducting material.

23. A process for preparing the thermistor of claim 14 having negative temperature coefficient of resistance for sensing temperature, said process comprising the steps of:

(a) heating $MnO_2$ to obtain the tetragonal form of $Mn_3O_4$;

(b) cooling the $Mn_3O_4$ of step (a);

(c) grinding the $Mn_3O_4$ of step (b) to obtain $Mn_3O_4$ of particle size less than about 60 microns;

(d) mixing the ground $Mn_3O_4$ of step (c) with about 5 weight % of $La_2O_3$;

(e) grinding and sieving the mixture of step (d) to obtain a ceramic mixture;

(f) adding stearic acid and wax to the ceramic mixture of step (e);

(g) grinding the mixture of step (f) optionally in the presence of an alcohol and sieving, and (h) compacting and sintering the ground mixture of step (g) and providing a first and a second electrode to obtain the thermistor.

24. A process as claimed in claim 23 wherein in step (a), the $MnO_2$ used is of analytical reagent grade.

25. A process as claimed in claim 23 wherein in step (a), the $MnO_2$ is taken in a silica crucible and heated up to 1050° C. for a time period ranging between 4 hours to 5 hours in a muffle furnace.

26. A process as claimed in claim 23 wherein in step (c), the $Mn_3O_4$ is ground in a mortar and pastel.

27. A process as claimed in claim 23 wherein in step (c), the $Mn_3O_4$ is sieved through a 250 size BSS mesh.

28. A process as claimed in claim 23 wherein in step (e), the mixture of $Mn_3O_4$ and $La_2O_3$ is ground in mortar and pestle.

29. A process as claimed in claim 23 wherein in step (e), the ground mixture is sieved through a 250 size BSS mesh.

30. A process as claimed in claim 23 wherein in step (f), about 1.0 weight % stearic acid and about 1.0 weight % wax are added to the ceramic mixture to improve flowability and binding capacity.

31. A process as claimed in claim 23 wherein in step (g), the mixture of $Mn_3O_4$, $La_2O_3$, stearic acid, wax and alcohol is ground in a mortar and pestle.

32. A process as claimed in claim 23 wherein in step (g), the ground mixture is sieved through a 250 size BSS mesh.

33. A process as claimed in claim 23 wherein if alcohol is added during grinding in step (g), the sieved mixture is gradually heated to remove the alcohol.

34. A process as claimed in claim 23 wherein in step (h), the ground mixture is compacted and sintered to form pellets, and the first and second electrodes are deposited on an outer surface of the pellet to obtain the thermistor.

35. A process as claimed in claim 23 wherein in step (h), the ground mixture is filled in tubes provided with the first and second electrodes, compacted and sintered to obtain the thermistor.

36. A process as claimed in claim 23 wherein the first and second electrodes being provided in step (h), are made of a conducting material.

* * * * *